Aug. 20, 1929.     H. MÜLLER     1,725,667

INCLOSED DYNAMO ELECTRIC MACHINE

Filed April 6, 1927

Inventor
Heinrich Müller
by
His Attorney

Patented Aug. 20, 1929.

1,725,667

UNITED STATES PATENT OFFICE.

HEINRICH MÜLLER, OF WAIDMANNSLUST, BERLIN, GERMANY, ASSIGNOR TO GENERAL ELECTRIC COMPANY, A CORPORATION OF NEW YORK.

INCLOSED DYNAMO-ELECTRIC MACHINE.

Application filed April 6, 1927, Serial No. 181,534, and in Germany July 2, 1926.

My invention relates to dynamo-electric machines, and more particularly to the inclosed type of machine in which the temperature rise during its operation is limited by circulating air within the machine adjacent heat radiating surfaces which are usually cooled by air circulating over them exteriorly of the inclosed portion of the machine.

In electrical machines the carrying off of the heat evolved during their operation is of great importance as their output is dependent upon it. In the case of inclosed machines, however, effective cooling is accompanied with great difficulty because the cooling medium from the outside of the machine cannot be brought into direct contact with the internal parts from which the heat evolved is radiated. In order to carry away the heat from these parts, passages are formed through the rotor or around the periphery of the stator, but these arrangements are not very effective because the passages are too far removed from the windings of the rotor.

According to my invention, the heat generated in an inclosed machine is carried off in a particularly effective manner by means of channels of any convenient form conveying a cooling medium, some of the channels passing through the stator around the inclosed portion and others being located closely adjacent the periphery of the rotor of the machine so that a rapid transfer of heat from the windings of the rotor to the cooling medium takes place.

Figure 1:
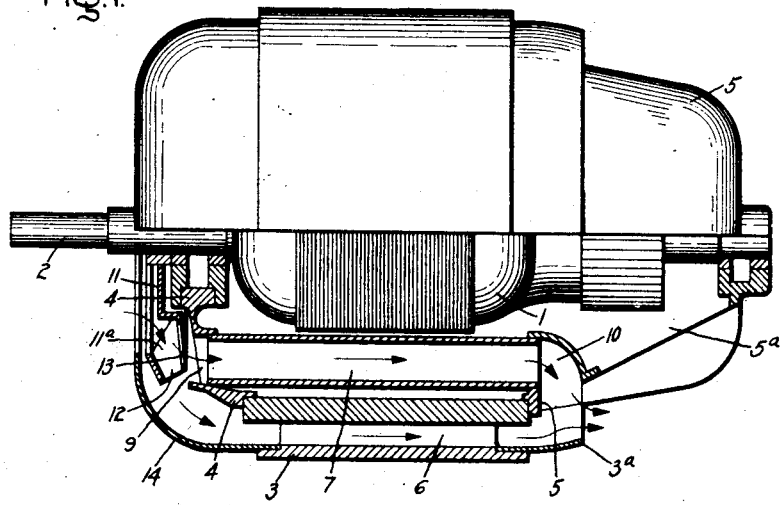
Figure 2:
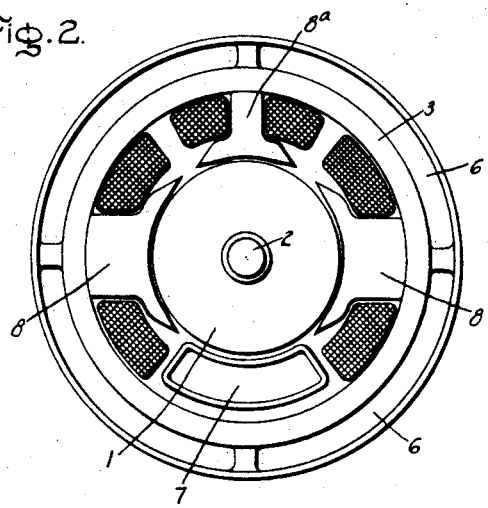

My invention will be more fully set forth in the following description referring to the accompanying drawing, in which Fig. 1 is a side view of an inclosed dynamo-electric machine partly in elevation and partly in longitudinal section; and Fig. 2 is an end view of the structure of Fig. 1 with part of the structure removed to more clearly show the relation of the air ducts to the windings and rotor of the machine.

Referring to the drawing the dynamo-electric machine illustrated is of the salient pole type and comprises a rotor 1 provided with a shaft 2 which is supported in the stator 3 by means of end members 4 and 5 engaging the ends of the stator. The end member 5 has an opening $5^a$ therein to afford access to the interior of the machine that is ordinarily closed by means of a suitable cover. These end members in addition to supporting the rotor also cooperate with the stator 3 to inclose the rotor. Inasmuch as the inclosure formed by the end members 4 and 5 cooperating with the stator 3 prevents air circulating through the machine for cooling, it is necessary to provide some means for carrying away the heat. The carrying away of the heat is effectively accomplished according to my invention by providing the stator 3 with air passages 6 which extend around the inclosed portion thereof and the duct 7 extending closely adjacent the periphery of the rotor 1 at the sides of the main poles 8 and opposite the interpole $8^a$ of the dynamo-electric machine. This duct 7 is supported in position by engagement with openings 9 and 10 formed in the end members 4 and 5 respectively. The rapidity of heat transfer in the passages 6 and duct 7 from the interior of the machine to the air passing through the passages and the duct which is required to cool the machine is assured by the use of a fan 11 provided with blades $11^a$ mounted on the rotor shaft 2 to rotate therewith. The fan 11 is provided with circumferentially arranged openings 12 and 13, the former discharging substantially radially against a baffle 14 so that the air therefrom will be deflected into the passages 6 through the stator, and the latter opening substantially longitudinally of the fan into the duct 7. Air circulated through the passages 6 and the duct 7 is discharged under a baffle $3^a$ at the end of the stator 3 which extends over the outlets from the duct and the passages.

In operation of the dynamo-electric machine shown, air will be circulated by the fan 11 through the passages 6 and the duct 7, as indicated by the arrows in Fig. 1. Heat evolved by the pole windings will be transmitted for the most part through the walls of the stator 3 to the passages 6 and thence to the air which passes therethrough. At the same time most of the heat evolved in the rotor of the machine will be transmitted through the wall of the duct 7 to the air circulated therein. Part of the heat from the pole windings and the rotor will also be transmitted directly to the air circulating within the inclosed stator and from the air therein to the walls of the stator and the duct 7, although the primary function of the latter is to absorb heat directly from the rotor.

It will be apparent from the foregoing that I have produced an inclosed dynamo-electric machine in which the stator and the rotor are effectively cooled by a simple arrangement of the passages for conveying cooling air.

What I claim as new and desire to secure by Letters Patent of the United States, is:—

1. In a dynamo-electric machine having a rotor and a stator provided with salient poles, means arranged to inclose the stator and the rotor, and an air duct within said stator communicating at both ends with the exterior of said means to afford openings for the circulation of air through the duct, said duct extending at the sides of said poles closely adjacent the periphery of said rotor for cooling the rotor.

2. In a dynamo-electric machine having a rotor and a stator provided with salient poles, end members cooperating with said stator to form an inclosure for the rotor, an air duct within said inclosure communicating at both ends with the exterior thereof to afford openings for the circulation of air through the duct, said duct extending closely adjacent the periphery of said rotor at the sides of said poles for cooling the rotor.

3. In a dynamo-electric machine having a rotor and a stator provided with salient poles, means arranged to inclose the stator and the rotor, said stator having passages therethrough extending around the inclosed portion thereof, an air duct within said stator communicating at both ends with the exterior of said means to afford openings for the circulation of air through the duct, said duct extending closely adjacent the periphery of said rotor at the sides of said poles for cooling the rotor, said rotor having a shaft extending through said inclosing means, and means adapted to circulate cooling air through said passages and said duct for cooling the stator and the rotor respectively.

4. In a dynamo-electric machine having a rotor provided with a shaft and a stator, end members cooperating with said stator to form an inclosure for the rotor, said end members being adapted to engage said shaft for supporting the rotor, said stator having air passages therethrough around said inclosure, an air duct within said inclosure communicating at both ends with the exterior thereof to afford openings for the circulation of air through the duct, said duct extending closely adjacent the periphery of the rotor, and means adapted to circulate air through said passages and said duct for cooling the stator and the rotor respectively.

5. In a dynamo-electric machine having a rotor provided with a shaft and a stator provided with salient poles, end members cooperating with said stator to form an inclosure for the rotor, said end members being adapted to engage said shaft for supporting the rotor, said stator having air passages therethrough around said inclosure, an air duct within said inclosure communicating at both ends with the exterior thereof to afford openings for the circulation of air through the duct, said duct extending closely adjacent the periphery of the rotor at the sides of said poles, and means adapted to circulate air through said passages and said duct for cooling the stator and the rotor respectively.

In witness whereof, I have hereunto set my hand this 18th day of March, 1927.

HEINRICH MÜLLER.